April 25, 1950   F. DERBENWICK ET AL   2,505,235
APPLE HALVING MACHINE
Filed Nov. 14, 1947   2 Sheets-Sheet 1

INVENTOR
FRANK DERBENWICK
JAMES F. RYAN, JR.
NORMAN C. CALHOUN
BY
Semmes, Keegin, Robinson & Semmes
ATTORNEYS

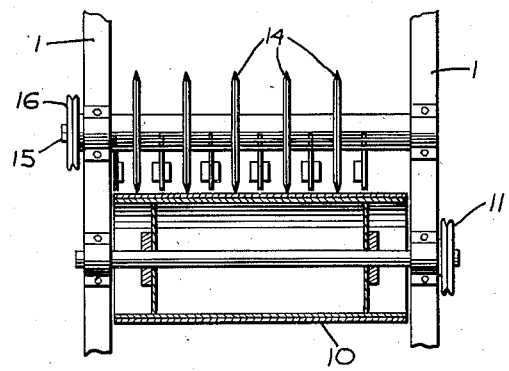
Fig. 3.
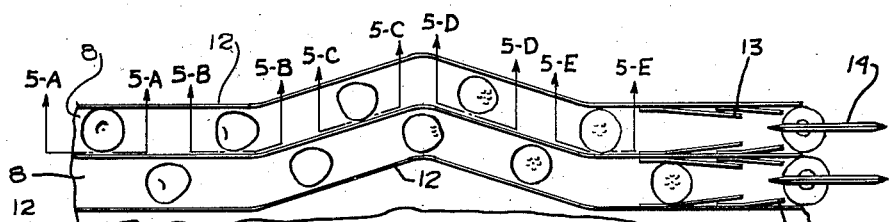
Fig. 4.
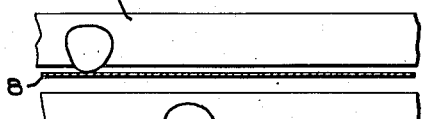
Fig. 5-A.
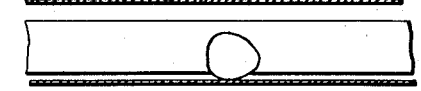
Fig. 5-B.
Fig. 5-C.
Fig. 5-D.
Fig. 5-E.
INVENTOR
FRANK DERBENWICK
JAMES F. RYAN, JR.
NORMAN C. CALHOUN
BY
Semmes, Keegin, Robinson + Semmes
ATTORNEYS Patented Apr. 25, 1950

2,505,235

UNITED STATES PATENT OFFICE 2,505,235

APPLE HALVING MACHINE

Frank Derbenwick, Oakland, James F. Ryan, Jr., San Leandro, and Norman C. Calhoun, Oakland, Calif., assignors to Gerber Products Company, Fremont, Mich., a corporation of Michigan Application November 14, 1947, Serial No. 785,998

1 Claim. (Cl. 146—73)

This invention relates to a machine for halving apples.

In the processing and canning of apples, as part of the operation it is desirable to cut the apples in half in the direction of the core so that they may be thoroughly inspected for decay and for worm infestation.

One object of this invention is to provide a machine for automatically cutting apples in half along the axes of their cores.

Another object is to provide a machine which automatically orients apples on either their stem ends or calyx ends, with their axes vertical, and holds them in that position while they are being cut in half.

Still other objects will be apparent from the following description, when read in connection with the accompanying drawings, in which:

Figure 3 is an end elevation of the machine, partly in section, on the line 3—3 of Figure 2.

Figure 4 is a partial plan view of the lanes for orienting the apples on their bases and of the spring steel fingers at the ends of the lanes for centering the apples and holding them in position while they are being cut in half by rotating knives, the view showing the progress of apples through the lanes.

Figure 1:
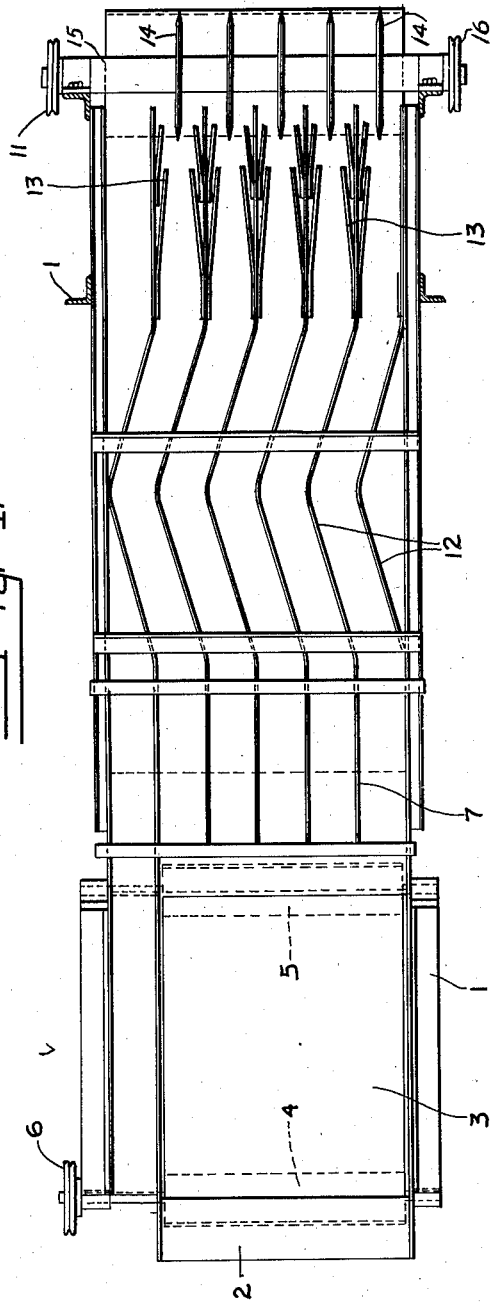
Figure 1 is a plan view of a preferred embodiment of a machine made in accordance with this invention.
Figure 2:
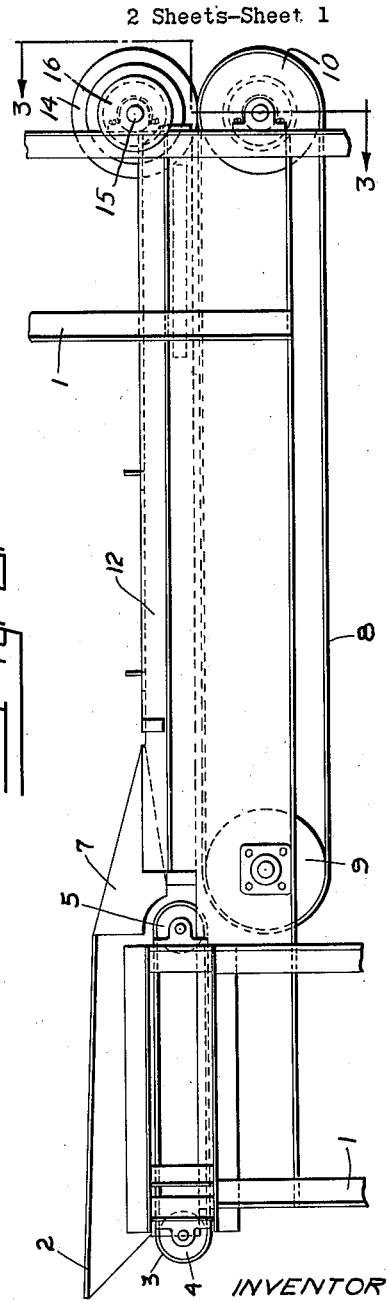
Figure 2 is a front elevation of the machine.

Figures 5-A, 5-B, 5-C, 5-D and 5-E are partial vertical sectional views along correspondingly numbered lines of Figure 4 illustrating the manner in which the lanes act to orient the apples on their ends or bases.

Like reference characters refer to like parts throughout the several figures of the drawings.

In the drawings, the numeral 1 indicates a suitable frame for the machine, supporting at one end thereof a hopper 2. The hopper is open in its bottom and is mounted close above an endless conveyor belt 3 passing over rollers 4 and 5, supported in suitable bearings in the frame 1. One of the rollers, for example the roller 4, may be connected by means of a pulley 6 to a source of power, not shown, for driving the roller and thereby the conveyor belt 3.

At the delivery end of the belt 3, a plurality of dividing plates 7 are attached to the delivery end of the hopper 2. These dividing plates are disposed in parallel relationship and are spaced apart just far enough to accommodate the largest apple to be halved by the machine. The apples are fed into the hopper 2 and are carried by the belt 3 to the dividing plates 7, by which they are arranged in single rows or files. The apples drop from the belt 3 after passing over the roller 5, between the dividing plates 7, onto a second conveyor belt 8 passing over rollers 9 and 10. One of the rollers 10 may be connected by a pulley 11 to a source of power, not shown, by means of which the roller 10 is caused to rotate and to transmit linear motion to the conveyor belt 8. Preferably, the belt 8 is caused to move at a speed approximately double that of the belt 3. The purpose of having the belt 8 move more rapidly than the belt 3 is to provide a space between each apple, as it falls from the belt 3 to the belt 8, and the succeeding apple.

A plurality of lanes or channels, corresponding in number and location to the lanes formed by the dividing plates 7, are formed adjacent the upper surface of the belt 8 by guides or baffle plates 12. As in the case of the dividing plates 7, the guides 12 are parallel and are spaced apart just far enough to accommodate the largest apple to be processed by the machine. As may be clearly seen in Figures 1 and 4, the baffles 12 are arranged in a slight zigzag for the purpose of deflecting the fruit. An apple has more stability when it is resting on either its stem end or its calyx end, rather than on its side. If an apple, upon dropping from the first belt 3 to the second belt 8, lands on either its stem end or its calyx end, the baffle plates 12 will merely slide it back and forth across the surface of the belt 8. However, if the apple lands on the belt on its side, the baffle 12 will roll it first in one direction, then in the other, and the result will be in the great majority of cases that the apple will come to rest on either its stem end or its calyx end.

This action is illustrated in Figures 4, 5-A, 5-B, 5-C, 5-D and 5-E, showing the successive positions of an apple as it is rolled by the baffles 12 onto one of its ends. In Figure 5-A, an apple has landed on the belt 8 on its side. Figures 5-B, 5-C and 5-D illustrate the action of the baffle plates 12 in rolling the apple until it comes to rest, as shown in Figure 5-E, on one of its ends or bases. It has been found that, if an apple does not find the place of greatest stability in going through the first change in direction caused by the baffles 12, in the great majority of cases, the other change of direction caused by the baffles will properly orient it on one of its ends. It has been found that with two such changes in direction, the machine will arrange 95 to 98% of the apples on their ends.

Near the ends of the lanes, spring steel fingers 13 are secured to the baffle plates 12 for the purpose of centering and holding the apples securely in position while they are being cut. The apples are cut in half by vertical circular knives 14, one of which is positioned centrally at the end of each lane. The knives 14 are mounted upon a shaft 15, which is driven through a pulley 16, attached to its end, by a suitable source of power, which is not shown. The shaft 15 is supported in suitable bearings on the frame 1.

This machine will satisfactorily cut apples from which the cores, calyxes or stems have been removed. In fact, their removal increases the stability of the apples on their ends. It has also been found that the apples may be peeled before being fed to the machine without affecting its operation.

The faster rate of motion of the belt 8 with respect to the belt 5 prevents two small apples from getting abreast of each other in the zigzag section, where one apple may be delayed momentarily, and causing a jam. This makes grading of the apples unnecessary and one machine with lanes wide enough to accommodate the largest apples can be used for apples of all sizes.

It will be appreciated that there is provided by this invention a machine which makes possible the reduction of labor costs in handling apples for canning. Moreover, the machine greatly speeds up the handling of large crops of fruit in the harvest season, so that spoilage due to delays in processing is minimized.

While the machine has been described in connection with the halving of apples, it will be appreciated that, if desired, it may be used for treating other fruits and vegetables having at least one relatively flat base. For example, the machine might be used for cutting other pomes, tomatoes, pineapples, or the like. It will also be appreciated that, by providing a greater number of rotating blades 14, the fruit may be sliced in layers instead of being merely halved.

We claim:

A machine for cutting apples in half through their core to allow inspection for infestation comprising a first conveyor belt for feeding the apples to the machine, a second conveyor belt adjacent the discharge end of the first conveyor positioned to receive apples from the first conveyor belt, said second conveyor moving more rapidly than the first conveyor whereby the apples are spaced along the second conveyor, a plurality of baffle plates supported above the conveyor belt, said baffle plates extending at an angle to the second conveyor to form a plurality of zig-zag channels through which the apples pass whereby the apples will be deflected and oriented in a position on their ends as they pass through the channels, flexible guide fingers at the discharge end of the channels for centering the apples, and rotating circular knives extending down between the fingers and just clearing the upper surface of the second conveyor belt for cutting the apples in half through their cores.

FRANK DERBENWICK.
JAMES F. RYAN, JR.
NORMAN C. CALHOUN.

REFERENCES CITED

The following references are of record in the file of this patent:

UNITED STATES PATENTS

| Number | Name | Date |
| --- | --- | --- |
| 1,079,573 | Morton | Nov. 25, 1913 |
| 1,214,519 | Demuth | Feb. 6, 1917 |
| 1,445,899 | McGregor | Feb. 20, 1923 |
| 1,513,007 | Remington | Oct. 28, 1924 |
| 2,441,884 | Johnson | May 18, 1948 |

FOREIGN PATENTS

| Number | Country | Date |
| --- | --- | --- |
| 303,178 | Germany | Jan. 26, 1918 |